United States Patent [19]
George

[11] Patent Number: 6,038,067
[45] Date of Patent: Mar. 14, 2000

[54] SCANNING COMPUTED CONFOCAL IMAGER

[75] Inventor: John S. George, Los Alamos, N.Mex.

[73] Assignee: The Regents of the University of California, Los Alamos, N.Mex.

[21] Appl. No.: 09/019,863

[22] Filed: Feb. 6, 1998

Related U.S. Application Data

[63] Continuation-in-part of application No. 08/652,745, May 23, 1996, abandoned.

[51] Int. Cl.⁷ .................................................. G02B 21/00
[52] U.S. Cl. ........................... 359/368; 359/618; 359/619
[58] Field of Search ................................... 359/618, 619, 359/237, 368

[56] References Cited

U.S. PATENT DOCUMENTS

| | | | |
|---|---|---|---|
| 5,572,359 | 11/1996 | Otaki et al. ............................. | 359/386 |
| 5,587,832 | 12/1996 | Krause ..................................... | 359/385 |
| 5,666,226 | 9/1997 | Ezra et al. .............................. | 359/621 |
| 5,715,081 | 2/1998 | Chastang et al. ...................... | 359/385 |

*Primary Examiner*—Thong Nguyen
*Assistant Examiner*—Craig Curtis
*Attorney, Agent, or Firm*—Milton D. Wyrick

[57] ABSTRACT

There is provided a confocal imager comprising a light source emitting a light, with a light modulator in optical communication with the light source for varying the spatial and temporal pattern of the light. A beam splitter receives the scanned light and direct the scanned light onto a target and pass light reflected from the target to a video capturing device for receiving the reflected light and transferring a digital image of the reflected light to a computer for creating a virtual aperture and outputting the digital image. In a transmissive mode of operation the invention omits the beam splitter means and captures light passed through the target.

29 Claims, 6 Drawing Sheets

SCANNING COMPUTED CONFOCAL IMAGER

The present application is a continuation-in-part application out of U.S. patent application Ser. No. 08/652,745, filed May 23, 1996, now abandoned.

FIELD OF THE INVENTION

The present invention generally relates to microscopes, and, more specifically to scanning confocal imaging. This invention was made with Government support under Contract No. W-7405-ENG-36 awarded by the U.S. Department of Energy. The Government has certain rights in the invention.

BACKGROUND OF THE INVENTION

Confocal imaging offers a number of advantages over conventional microscopy for quantitative imaging, including improved image contrast, resolution and limited depth of field to support optical sectioning or quantitative three dimensional spatial sampling. Conventional confocal imaging systems incorporate several basic functional subsystems in order to achieve the generally cited advantages of confocal imaging. These functional subsystems include: a system for scanned illumination; a spatial filter or aperture in the focal plane of the detector to reject out-of-focus light; and imaging optics to bring the illumination and imaging paths into focus at the same location.

A conceptually simple prior art confocal microscope for transmission imaging involves light from a light source being transmitted through a pinhole and brought to focus within a sample volume by imaging optics. Light emerging from the sample is brought to focus on a pinhole aperture by a second set of imaging optics. This aperture rejects most of the light that did not pass through the confocal point in the sample volume, thereby reducing image contributions from light scattered or refracted from other locations within the medium.

The detector for such a system typically consists of a single channel device such as a photodiode or a photomultiplier. In order to collect an image, it is necessary to scan the illumination and detection subsystems in a coordinated manner.

However, the technical requirements for coupled electromechanical scanning to preserve the required optical alignment between illumination and imaging pathways are formidable. Most practical embodiments of a transmission can significantly enhance the speed, flexibility and ease of use confocal system utilize mechanical scanning of the sample so that the imaging elements do not move.

The typical configuration for confocal imaging in reflected light or fluorescence modes employs the same imaging optics and often the same pinhole aperture for both the illumination and imaging paths. This arrangement simplifies optical alignment and facilitates optical scanning, either by mechanical movement of the aperture, or by shifting the image of the aperture by mirrors in the optical path. In most designs, the scanning of the illumination path and the "descanning" of the imaging path are accomplished with the same set of mirrors. Image acquisition in most existing systems is slow, a fact which complicates preliminary inspection of a sample and the focusing of the scanned image.

Spinning disk confocal systems are a useful implementation of the reflected light or fluorescence modes described above. In this type system, the scanning and aperture functions are embodied in an opaque disk containing a pattern of optically transmissive pinholes arranged in a spatial array so that during a revolution of the disk, the entire sample image plane is illuminated. The disk is rotated at a high speed, with each pinhole serving as the aperture for both the illumination and the imaging paths. Because a number of locations within the sample are scanned in parallel, the detector consists of a spatially resolved area detector such as a video camera, although direct viewing by eye is also possible. These systems can significantly enhance the speed, flexibility and ease of use of confocal microscopy, but they typically suffer from low sensitivity because most of the incident light is absorbed by the opaque regions of the disk, and from problems associated with reflection from the disk surface. These systems also are relatively bulky, and the gyroscopic nature of the spinning disk inhibits their use in compact portable imaging systems such as endoscopes.

Another complementary strategy for high performance confocal imaging is to use an illumination source configured as a line instead of a point, with a slit aperture. This allows parallel detection using a specialized detector such as a linear CCD, considerably reducing imaging time. This performance enhancement comes at the expense of some degree of compromise in the image quality. This is because, in a line scan configuration, out-of-focus light that happens to fall onto the slit aperture contributes to the image. However, in practice, the degradation of confocal image quality is not unacceptably severe. This type system does produce a brighter image, although the additional light is presumed to be non-confocal. Such systems are considerably simpler and faster than systems used for point scanned illumination, since the pattern of illumination is scanned in only one dimension. Other approaches to confocal scanned illumination in principle offer even higher performance. One existing instrument scans a laser in two dimensions, using a galvanometrically driven mirror for one dimension and an acousto-optic beam steering device for the second. This system achieves confocal image rates faster than standard video. However, in fluorescence mode the emission wavelength shift causes image light to be descanned improperly by the acousto-optic device. The confocal image quality of this device is comparable to that of a linescan confocal imager.

Another strategy for high performance confocal imaging is to dispense with mechanical scanning altogether, and to use acousto-optic devices for scanning a laser in both dimensions. In one such design, the detector is based on an image dissector videcon, a television detector tube that allows random access readout of the tube photocathode at user defined coordinates specified by a pair of analog voltages. Readout position can be adjusted to precisely match a peak of illumination in the imaging detector. However, as with most other tube-based video detectors, the image dissector has been rendered obsolete by the advent of solid-state video devices. A commercial version of this type of confocal imager has not been produced. Because optoacoustic devices operate by modulating the index of refraction of a transmissive element, the devices are of little utility for steering white light. Even for laser applications, the beam displacement varies as a function of wavelength, and polychromatic light is dispersed, creating problems for confocal imaging.

A number of strategies for electronically programmable illumination have been explored, although until recently none has proven practical. An early strategy was to use the spot from a CRT as a moveable illumination source for scanned microscopy. However the intensity proved to be too low for practical microscopic imaging. The advent of video projectors based on LCD devices in the late 1980s stimulated the development of prototype scanning systems. However, the size, inefficiency and low contrast of the devices precluded the development of a practical imager. Subsequent development of miniature LCDs has addressed some of these problems, although pixel quality was a problem in early devices. In addition, LCDs achiever gating of transmitted illumination based on polarization, limiting their efficiency for illumination and placing constraints on their use as an imaging aperture, particularly for fluorescence imaging.

New technologies based on micromechanical devices appear to address many of the concerns noted with earlier prototype systems based on LCD and similar devices. Digital Light Processing (DLP) technology developed by Texas Instruments employs an array of microscopic mirrors that can tilt back and forth between two limit positions based on the state of an associated Random Access Memory (RAM). Light from a collimated illumination source is reflected into the optical path or is dumped into a light sink. Devices presently available are optimized for video projection applications, requiring a digital video source to drive the array, and producing the perception of analog intensity by rapidly flickering individual mirrors. However, it is possible to use such an array for binary illumination driven by direct access of the device frame RAM by a host computer.

A recent patent issued to Krause (U.S. Pat. No. 5,587,832) describes an application of such devices for confocal imaging. The patent describes the use of a novel microshutter array; however, the fundamental strategy is compatible with the use of existing micromirror technology. One array is used as a source for programmable scanned illumination. Another array (or the same one) is used as a programmable aperture array for an associated 2D-area detector, such as a CCD. Such an imaging configuration is relatively simple to realize for reflected light or fluorescence modes employing a single array for illumination and imaging. However, the requirement to precisely align all of the corresponding shutter pairs for a transmitted light measurement is likely to prove a significant technical challenge. Although this system employs an alternative technology, the approach is not different in principle from spinning disk confocal systems. A physical aperture array is used to produce a temporal sequence of complementary spatial patterns of illumination. In the imaging pathway, a correlated physical aperture array is employed to reject out-of-focus light.

A practical problem with this approach is its inefficient use of illumination light. In order to minimize overlap between the point spread functions of adjacent illuminated pixels, these sites must be separated in both dimensions of the illumination array. A comparatively small fraction of the pixels are on at any given time during scanning. For example, if every fifth pixel in x and y are turned on, only $\frac{1}{25}$ of the available light is used in any given image. This means that the pattern must be shifted 25 times, and that 25 component images are acquired to completely sample the image field. In practice, this approach is acceptable for many transmitted light applications, and for reflected light imaging of highly reflective samples. However, the inefficiency of this device is a serious handicap for light limited applications such as fluorescence imaging.

In the present invention, an alternative method for producing a regular array of scanned illumination points has been developed. Microlens arrays that consist of many small lens elements in a close packed array now are commercially available. Existing arrays have as many as 256×256 elements. The pitch between adjacent elements (i.e. the center to center spacing) is often 200 microns or less. If collimated light is passed through such a lens array, an array of spots is produced in a plane displaced from the microlens array by the focal length of the lens elements. The effective aperture of the array is large, although the acceptance angle of individual elements may be limited. Typically, greater than 95% of incident light may be transmitted by such an array. These arrays are small (mm to cm) and lightweight, and can be mechanically scanned by range of devices including galvanometers, stepping motors, piezo-ceramic devices, and other actuators. For 2-dimensional scanning, it only is necessary to translate the microlens array over distances comparable to the pitch length, with incremental displacements dependent on the desired resolution of the scan. To simplify mechanical requirements for scanning a regular microlens array, the array can be tilted relative to the axis of translation. This allows scanning in one dimension to achieve resolution of less than the pitch length in both dimensions. However, the same number of incremental displacements is required to achieve the same resolution.

Thus, a number of practical solutions for scanned illumination suitable for use in confocal imaging have been developed, including the novel method described above. However, most methods for true confocal imaging demonstrated to date, in addition have required a physical imaging aperture. This is often a pinhole in a conjugate focal plane of the imager. In some designs, the imaging pinhole is replaced with a concave (diverging) lens, and an adjustable iris-type aperture. This allows collection of more light by graded adjustment of the aperture, at the expense of degraded confocal performance. In another patented design, an optical fiber replaces the pinhole aperture used for illumination and detection. This approach greatly simplifies the linkage between a conventional microscope and confocal illumination and detection subsystems. In most practical designs, the imaging aperture is the same as the illumination aperture, or is mechanically coupled to it. A notable exception is the use of an electronically driven aperture array as disclosed in the Krause patent, but, even in this case, a physical aperture is employed.

The confocal imager employing an image dissector vidicon is an example of a virtual aperture. No physical device is used to limit the light reaching the detector array, but the effects of such an aperture are simulated by the method of readout of the detector. The use of an analog image tube is an important feature of this approach, since it allows the region sampled by the image dissector tube to be precisely aligned with the image of the illumination spot.

It also is possible to construct a virtual aperture using a modern area detector such as a CCD. Pixels in such an imager correspond to discrete elements within an array. Because each detector element accepts light from a limited region of the focal plane, it serves as a small fixed aperture.

A patent issued to Batchelder et al. (U.S. Pat. No. 5,510, 894) describes a simple form of virtual confocal aperture for Raman spectroscopy accomplished by selective binning and readout of the photoreceptor array, or by equivalent post-processing procedures. This strategy produces an effect analogous to a pinhole in a conventional spatial filter used for confocal imaging. Although specific aspects of this method are rather specific for Raman spectroscopy, the general ideas can be extended for other forms of spectroscopy. The Batchelder et al. patent also describes a simple extension of the method for spatially resolved spectroscopy or spectral imaging, implemented by placing the sample on a scanning table, and sequentially applying the same virtual aperture to the series of point or line spectra arising from the raster scan of the sample. This is a slow, awkward system that employs expensive apparatus, and which places severe constraints on its application. Such a system is not suitable for imaging of dynamic processes (or even real-time imaging of slow processes), and it requires that the sample be small and moveable. This often is not the case in macroscopic or endoscopic applications.

The Batchelder et al. patent does not anticipate the use of spatially scanned illumination with a fixed sample and imager to achieve a spectrally resolved image, nor does it anticipate that many points might be illuminated in parallel to greatly increase the efficiency of confocal spectral imaging. In the Batchelder et al. system, the imaged point or spectrum occurs at the same position on the detector array regardless of the position of that point on the sample. The processing methods described by Batchelder et al. do not deal with several complications posed by the inconsistent sampling of the continuous image by the sensor array relative to a scanned illumination point source or illumination array. These are significant extensions to the computational method which are necessary to construct a virtual aperture array suitable for use with scanned illumination schemes.

Although the present invention is based on the same principles as the prior art confocal imaging systems, it realizes the necessary functional subsystems in a novel and beneficial way. It enables a number of possible applications and produces numerous advantages.

It is therefore an object of the present invention to provide a confocal imaging apparatus sufficiently compact to allow its use in medical applications.

It is a further object of the present invention to provide confocal imaging apparatus having high sensitivity, speed and dynamic range in a flexible and cost effective implementation.

It is a still further object of the present invention to provide confocal imaging apparatus that can produce a complete spectrum for each image pixel.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided a confocal imager comprising a light source emitting light in optical communication with spatial light modulating means for varying the spatial and temporal pattern of the light to scan across a sample, with beam splitting means for receiving the scanned light and directing the scanned light onto a sample and passing light reflected, scattered and emitted from the sample to video capturing means for receiving the reflected, scattered and emitted light and transferring a digital image of the reflected, scattered and emitted light to computer means for creating a virtual aperture and synthesizing a composite confocal image and displaying the confocal image.

In a further aspect of the present invention there is provided a confocal imager comprising a light source emitting light in optical communication with spatial light modulating means for varying the spatial and temporal pattern of the light to scan across a sample, with light focusing means for receiving light transmitted through the sample and focusing the transmitted light on video capturing means for receiving the transmitted light and transferring a digital image of the transmitted light to computer means for creating a virtual aperture and synthesizing a composite confocal image and displaying the confocal image.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus and method for computed confocal imaging owing to its use of a spatial light modulator and computational virtual aperture. The invention can be understood most easily through reference to the drawings.

Figure 1:
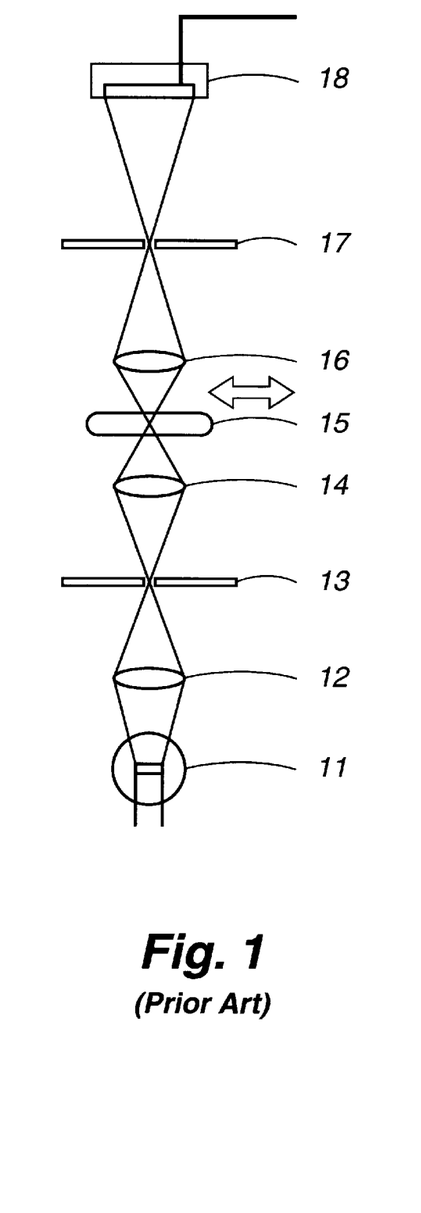
FIG. 1 is a schematic illustration of one method of the prior art for accomplishing confocal imaging in transmission mode.

Referring first to FIG. 1, there can be seen a schematic drawing of a simple transmission confocal imaging system of the prior art. Here, light emitted by light source 11 is collected by condenser lens 12 and transmitted through pinhole aperture 13 and brought to a point focus within the volume of sample 15 by illumination imaging optics 14. Light emerging from sample 15 is brought to focus on pinhole aperture 17 by second imaging optics 16. Pin hole aperture 17 rejects most of the light that did not pass through the confocal point in sample 15, thereby reducing image contribution from light scattered or refracted from other locations within sample 17. Detector 18 collects the image, and usually consists of a single channel device, such as a photodiode or photomultiplier. In order to collect an image, it is necessary to scan both the illumination and detection systems.

The technical requirements of having coupled electromechanical scanning while preserving the required optical alignment between illumination and imaging pathways are formidable indeed. Most practical embodiments of this transmission confocal system utilize mechanical scanning of sample 15 so that the imaging elements do not have to move.

Figure 2:
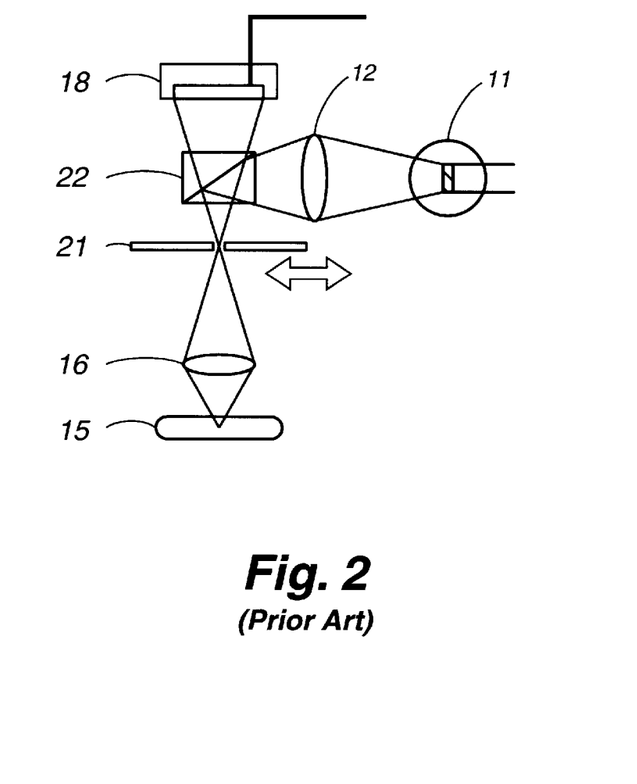
FIG. 2 is a schematic illustration of one method of the prior art for accomplishing confocal imaging in reflected light or fluorescence mode.

FIG. 2 illustrates the conventional configuration of the prior art for reflected light or fluorescence modes. This configuration employs the same imaging optics 16 as the transmission configuration of FIG. 1, and often uses only one pinhole aperture 21 for both the illumination and imaging paths. This portion of the optical pathway is shared, but illumination and imaging pathways are typically separated by some type of Light from sample 15 is then focused onto video capturing means 34 by imaging optics 16. Video capturing means 34 can be conventional video camera, a charge-coupled device (CCD), a charge injection device (CID), a photodiode array camera such as the EG&G RETICON®, or similar device, and might incorporate auxiliary subsystems such as an image intensifier.

Spatial light modulator 32 could take the form of a liquid crystal display (LCOD) such as is used in some video projectors. This is a mature technology, and represents a flexible and cost effective spatial light modulator 32. However, other transmissive technologies such as ferroelectric liquid crystals, and reflective technologies such as micro-mirror devices may offer better performance than the LCDs. Additionally, acousto-optic devices in which an acoustic signal applied to a crystal modulates a light beam could be used as spatial light modulator 32. A novel method for scanned illumination is described in FIG. 5.

The second key aspect of the present invention is the use of a "synthetic" or "virtual" aperture constituted computationally during or after readout from video capturing means 34. In general, this synthetic or virtual aperture is implemented in software running on computer 36, which may be a computer or a specialized digital signal-processing engine. Computer 36, through the software, creates a synthetic composite confocal image that is displayed.

Figures 3, 4:
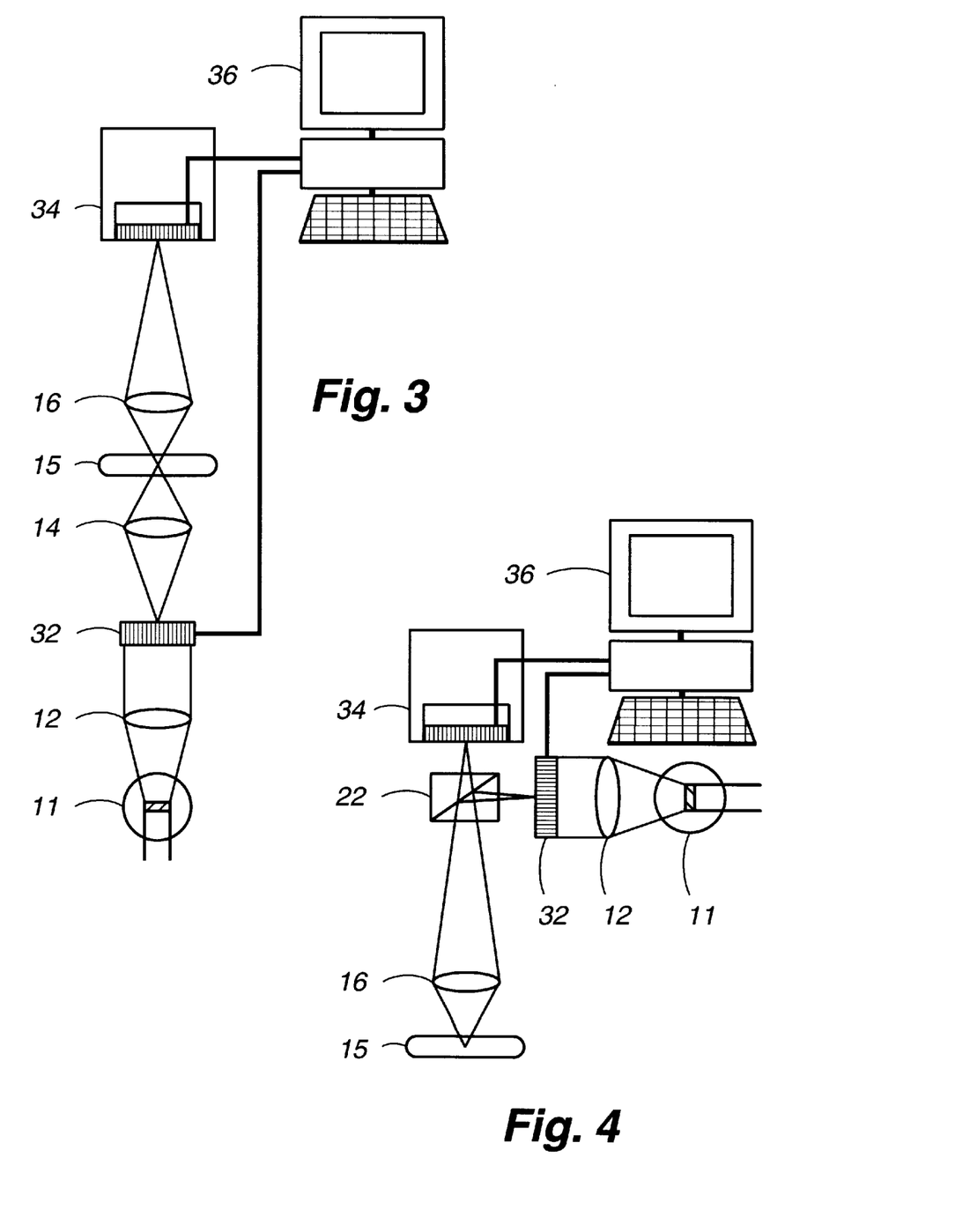
FIG. 3 is a schematic illustration of the principal features of the present invention showing the relationship between the components for imaging in transmission mode.
FIG. 4 is a schematic illustration of the principal features of the present invention for imaging in reflected or fluorescence mode.

The reflective embodiment of the present invention is illustrated schematically in FIG. 4. Here, Light source 11 emits light which is received by spatial light modulator 32 which serves, as in the embodiment illustrated in FIG. 3, to produce a spatially and temporally varying pattern of light which is received by beam splitter 22 and directed onto sample 15 through imaging optics 16.

Reflected light or fluorescence emission from sample 15 is passed back through imaging optics 16 to beam splitter 22 and into video capturing means 34, which produces a digital image of sample 15 which is transferred to computer 36. As in the previous embodiment, software running in computer 36 creates a virtual aperture and synthesizes a composite confocal image of sample 15 which is displayed by computer 36.

Imaging optics 16 can be any of many types of optics which are capable of collecting and focusing light. It can be a microscope objective lens, a gradient index lens, or even a macroscopic photographic or videographic lens.

As with the prior art reflective confocal imager of FIG. 2, beam splitting means 22 can take the form of a beam splitter, a dichroic mirror, a bifurcated fiber optic, or other optical device for serving the function of beam splitting means 22. It is only necessary that beam splitting means 22 have the ability to direct light from light source 12 onto sample 15, and to pass the reflected light and fluorescence emission from sample 15 to video capturing means 34.

Figure 5A:
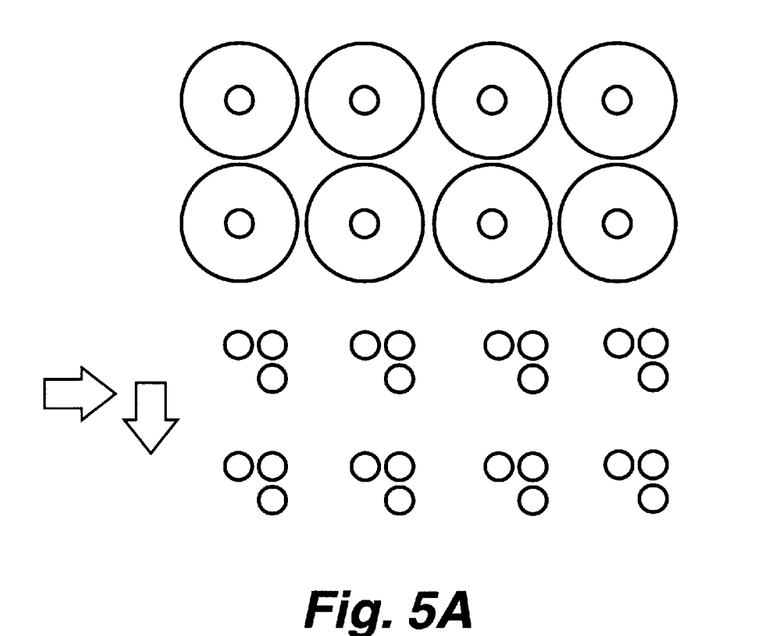
FIG. 5 is a schematic of a novel method for high efficiency scanned illumination employing a microlens array.

FIG. 5 illustrates a novel method for scanned illumination that provides highly efficient use of the illumination light. A microlens array consists of a number of refractive elements in a close packed array. These elements or "lenslets" are illustrated by the large circles in FIG. 5A. If collimated light is passed through this lens array, the light collected by each lenslet is brought to a point focus at a plane displaced from the lens array by a distance equal to the focal length of the lenslets. These focused points of illumination are illustrated by the smaller circles in FIG. 5. The lower panel of FIG. 5A illustrates partial sampling of the image plane beam splitting means 22, such as a beam splitter, dichroic mirror, bifurcated fiber optic, or other optical device serving this function.

This arrangement simplifies optical alignment and facilitates optical scanning, allowing either mechanical movement of aperture 21 or shifting the image from aperture 21 with mirrors in the optical path. In most designs, the scanning of the illumination path and the descanning of the image path are accomplished with the same set of mirrors. Image acquisition in most existing systems employing this configuration is slow, a fact which complicates focusing and preliminary inspection of samples 15. However, recent systems employing mirrors driven by resonant galvanometers, or hybrid systems incorporating a mirror and an acousto-optic device achieve considerably higher performance.

The present invention operates with the principles developed for the prior art confocal imagers, but realizes the necessary functional subsystems in such a novel way that a number of advantages and new applications are enabled. To understand the present invention, reference to the remaining drawings should be made.

Figure 5B:
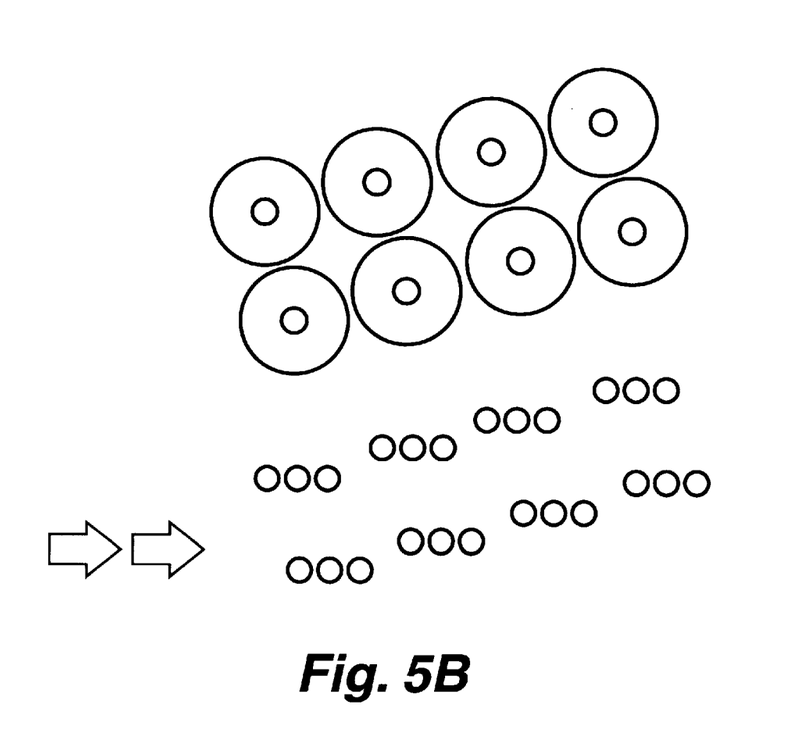

In FIG. 3, a schematic drawing of a transmission imaging system according to the present invention is illustrated. Here, it can be seen that light from light source 11 and condenser lens 12 is transmitted through spatial light modulator 32 and focused into sample 15 by illumination imaging optics 14. Spatial light modulator 32 is one of the key aspects of the present invention. For the purposes of the present invention, the term, spatial light modulator, refers to devices that can be electronically driven to produce time-varying spatial patterns of light from light source 11. Light source 11 may be an emitter of white light, or may be a laser. produced by translation of the microlens array in two dimensions. The illustrated grid is produced by three positions of the microlens array. By additional translations in two dimensions, the entire image plan can be sampled. FIG. 5B illustrates an alternative scanning geometry achieved by tilting the microlens array. This configuration can achieve high density sampling by a series of translations along a single dimension.

Figure 6A:
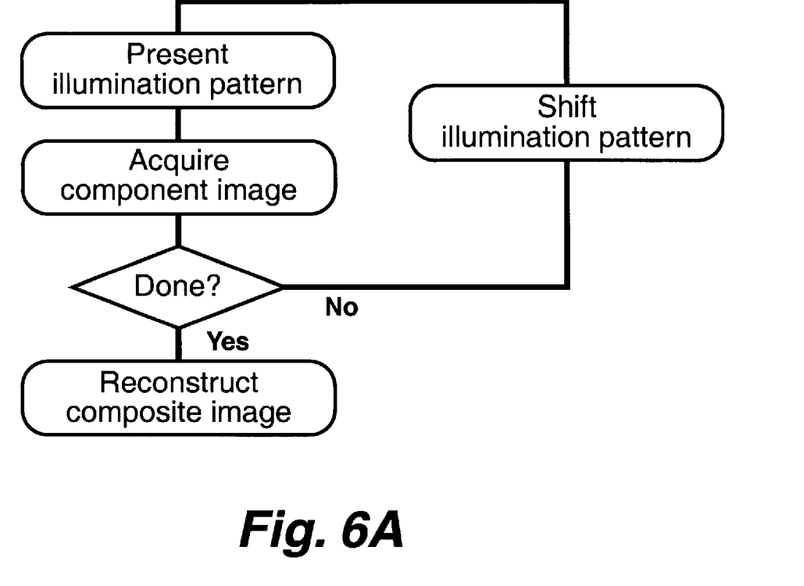
FIG. 6 is a flowchart outlining the procedures for the collection of component images and the reconstruction of a composite confocal image according to the present invention.

FIG. 6A illustrates the method for the collection of the component images that are combined to produce a composite confocal image. As indicated in the flow chart, the general pattern of operation of confocal imagers according to the present invention involves multiple image acquisition cycles, each with a different pattern of illumination, for each confocal image to be synthesized.

In the implementation of such a device illustrated in FIG. 3, Computer 36 produces appropriate control signals to drive spatial light modulator 32 to produce a particular spatial and temporal pattern of illumination. For different forms of spatial light modulator 32 the control signal may take the form of a video signal produced by computer hardware under the control of image acquisition software, or direct access to the RAM controlling the state of the spatial light modulator. For mechanical scanning systems the control signal may take the form of digital pulses (for stepping motor control) or analog outputs related to the required translation or rotation.

This illumination pattern may be a grid of illuminated points, a set of lines or other pattern depending on particular imaging requirements. Data is acquired from video capturing means 32 and is stored in computer 36, following exposure to the pattern of illumination. The pattern of illumination is changed, for example, when the grid of illuminated points is shifted, and the video acquisition cycle is repeated until the image field has been illuminated.

For example, if a point-grid pattern were employed, with every fifth pixel illuminated in each dimension, 25 image acquisition cycles would be required to achieve uniform illumination of the image field. The composite computed confocal slice image is created by appropriate mathematical combination of the stack of component images acquired from the same location with different patterns of illumination.

The performance and efficiency of the present invention can be further improved with the use of sophisticated readout procedures made possible with video capturing means 34. Most solid state cameras have the capability of skipping (or dumping) entire video lines or portions of lines at a much higher rate than is required for a standard readout. Utilizing this capability of solid-state video capturing means 34 allows extremely fast image acquisition and more efficient image memory storage with the present invention.

The synthetic aperture employed by the present invention can be constructed by a variety of techniques of greater or less sophistication. In general, each pixel within the target composite image array is defined as a weighted linear combination over one or more elements of a single component image plane (i.e. one of the component images within the stack).

Figure 6B:
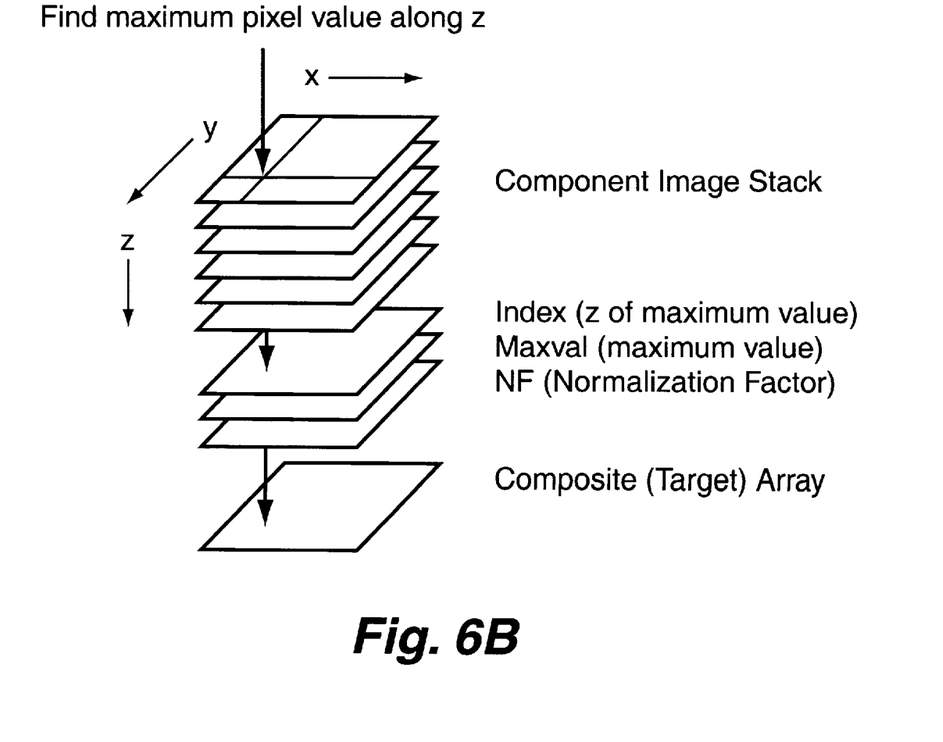

FIG. 6B illustrates a simple but effective method for deriving a reconstruction algorithm that in turn defines a synthetic aperture. This method employs a calibration image collected under the same optical conditions as the sample image (i.e. with equivalent slide, medium, coverslip etc.) but without an actual in-focus sample. A stack of these images are acquired, one for each separate pattern of illumination. For this method, the number and arrangement of illumination pixels should be set roughly equivalent to the number of pixels in the imager.

In this reconstruction procedure, the number of pixels in the target composite image is set equal to the number of pixels in each composite image (analogous to spinning disk confocal systems). For each pixel location in x and y in the target image, the maximum value of this pixel location through the entire stack of calibration images is determined. The stack (z) index and the maximum value of are recorded in two arrays (denoted as Index and Maxval in FIG. 6B). For each pixel a normalization factor (NF) is computed: NF=Constant/Maxval. These values are also stored in an array for future use. Each array has the same dimensions as the target composite image array.

During reconstruction, the calibration image stack is replaced by a sample image stack. For each pixel location in x and y, the Index array is used to determine the stack index of the source pixel within the sample image stack of component images. This pixel is multiplied by the corresponding element of the NF array and the product is stored in the composite image array.

Figures 7A, 7B:
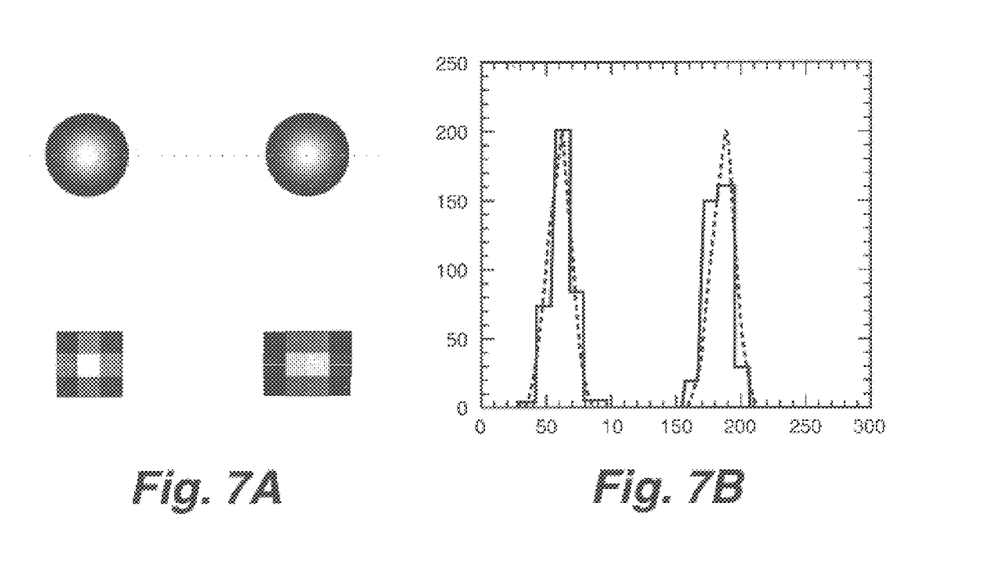
FIG. 7 is a schematic illustrating spatial sampling of a continuous distribution with an array of discrete sensors.
Figure 7C:
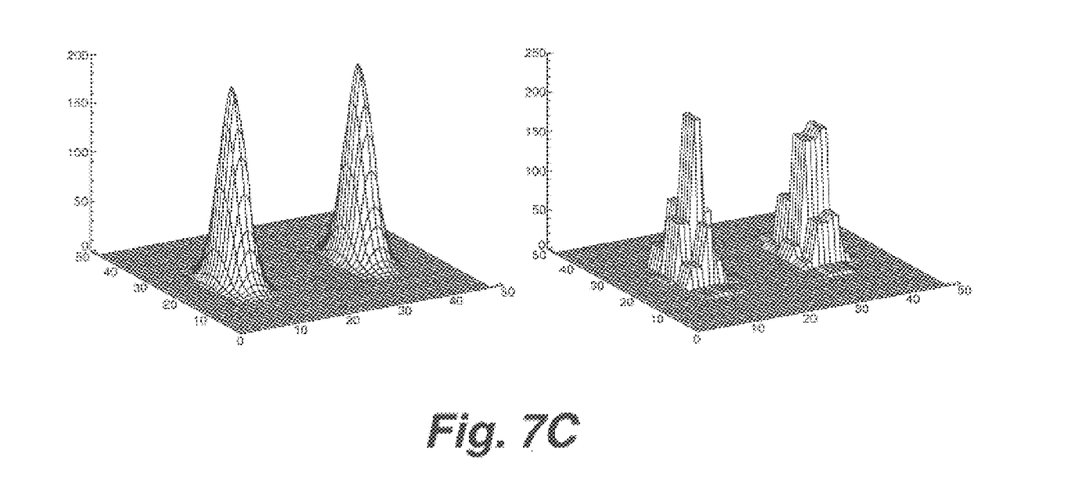

If each illumination pixel were precisely aligned relative to the corresponding image pixel, the synthetic aperture might be formed by the method of the Batchelder et al. patent, i.e. by taking the value of a single image pixel or the sum over a defined set of pixels. However, as illustrated in FIG. 7, the problems introduced by discrete sampling of a continuous function will in general invalidate this strategy. The left-hand panel of FIG. 7A illustrates a pair of Gaussian intensity distributions (for example corresponding to diffraction limited point illumination) in continuous form (above) and as sampled by a discrete detector array (below). The intensity profile sampled through each of these Gaussian-derived peaks is illustrated in the right hand panel of FIG. 7A. 2D plots corresponding to the continuous and discrete-sampled forms of the Gaussian distributions are illustrated in FIG. 7B. Note that if the value of the peak pixel in the sampled distributions were taken directly as the value of the corresponding target image pixels, the resulting reconstruction of the calibration image would contain significant intensity fluctuations due to discrete sampling. The normalization step eliminates this problem.

A second example will serve to illustrate an alternative method for image reconstruction. In this method, a calibration image is useful, but is not necessary. The number and arrangement of pixels in the target composite image is set equal to the number of illumination points sampled by the imager, across the entire stack of composite images. The resolution of the imager is chosen to allow adequate sampling of the point spread function. However, the density of the composite illumination array may significantly exceed the resolution of the imager. If the form of the point spread function is known, it is possible to detect sub-pixel shifts in the location of the illumination spot, a condition known as hyperacuity.

If a calibration image is available, local peaks in each of the calibration component images are identified, and a small region of surrounding pixels is identified as the source region. This region typically spans the point spread function of the corresponding illumination point. The intensity distribution across this region can be fit with an appropriate model function such as a Gaussian, allowing determination of the relevant parameters (e.g. center location, peak amplitude, half-width). Based on this model, it is possible to compute the integral intensity of light that would be passed by an aperture centered on the peak of the underlying continuous intensity distribution. This aperture can be expressed as an array of coefficients, one for each element of the source region. The value of each pixel in the composite image array is computed as a linear combination over the corresponding source region. Each element in the source region is multiplied by its associated coefficient, and the resulting scaled elements are summed.

If a calibration image is not available, intensity fluctuations due to differential absorbance or reflection across an image may prevent reliable identification of all of the local peaks. However, since the overall structure of the pattern of illumination is known (as well as the relationship between individual component patterns), these locations can be predicted. In one method, the patterns of identified local peaks are fit with a grid composed of low-order polynomial splines. Such a grid can accommodate the warping of the regular illumination grid introduced by optical aberrations. Source regions are identified around each of the grid points, whether or not a local intensity peak is discernable. The aperture coefficient array can then be constructed as described above. Additional constraints on the model may be useful. For example, the form of the grid within some local region should be consistent between different component images, and the form of the point spread function should be locally correlated even though it may vary across the image.

Because the synthetic aperture is implemented in software, it is possible to adjust key parameters, such as the effective aperture size, to optimize image attributes, even subsequent to acquisition of the basic image data. By employing different forms of synthetic aperture, it is possible to compute different modes of image contrast from the same basic data: for example, dark field and bright field transmitted light images. modes of image contrast from the same basic data: for example, dark field and bright field transmitted light images.

Figures 8, 9:
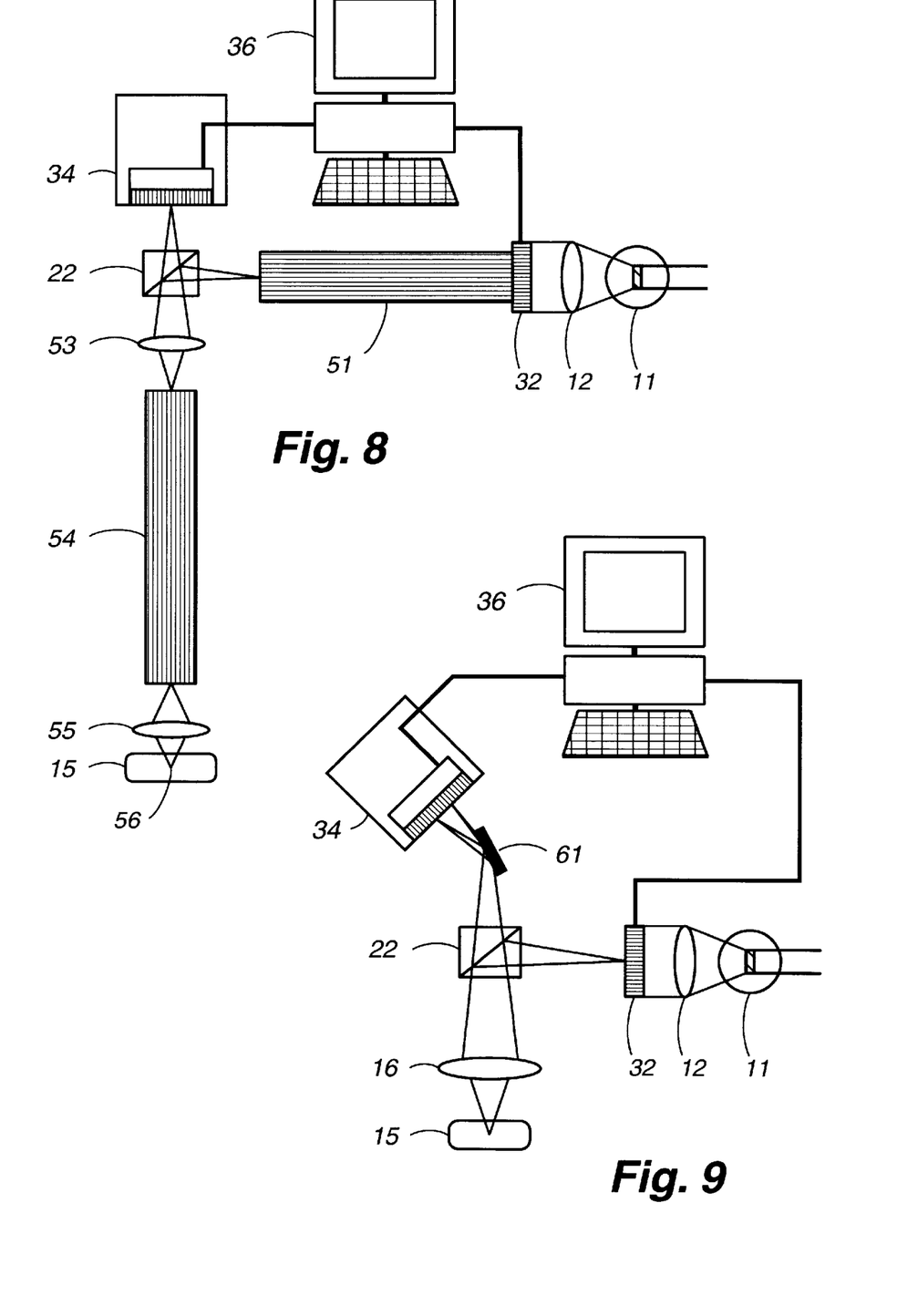
FIG. 8 is a schematic illustration of the present invention applied in a configuration for endoscopic imaging.
FIG. 9 is a schematic illustration of the present invention applied in a configuration for spectroscopic imaging.

The present invention can also be readily applied to endoscopic investigations as illustrated in FIG. 8. Here it can be seen that light guide 51 directs light from spatial light modulator 32 onto beam splitting means 22 which directs the light through relay objective 53 into the proximate end of image guide 54. Light exits the distal end of image guide 54 and passes through endoscope objective 55 onto site 56 within sample 15. Light reflected, scattered or emitted from site 56 then passes back through endoscope objective 55, into image guide 54, through relay objective 53, through beam splitting means 22 and into video capturing means 34, which may be a CCD camera.

An embodiment of the present invention for spectroscopic imaging for reflected light or fluorescence imaging is illustrated schematically in FIG. 9. As can be seen, light exits spatial light modulator 32 and enters beam splitting means 22 where it is directed toward relay or imaging objective 53 or 16. Light returning from site 56 (FIG. 8) is passed through beam spitting means 22 and into dispersive optics 61 and then into video capturing means 34. Dispersive optics 61 can be either a prism or grating that is capable of transforming the light returning from site 56 into a spectrally resolved line image and providing the spectrally resolved line image to video capturing means 34.

The use of the present invention in specific derivative applications may require additional optical components. For example, the spectral imaging apparatus illustrated in FIG. 9 may be operated in an endoscopic mode as in FIG. 9, or in a transmitted light mode as in FIG. 3. The spectral imaging apparatus might incorporate a second video capture means 34 to allow simultaneous acquisition of spectroscopic and standard confocal images. Additional relay optics may be required in this or other configurations of the present invention.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A confocal imager comprising:

a light source emitting light;

light modulating means in optical communication with said light source for producing a spatially and temporally varying pattern of illumination consisting of a plurality of discrete illumination sites;

beam splitting means receiving said spatially and temporally varying pattern of illumination for directing said spatially and temporally varying pattern of illumination through imaging optics onto a sample and passing reflected and fluorescent emission light from said sample after return passage through said imaging optics and said beam splitting means;

video capturing means receiving said reflected and fluorescent emission light from said imaging optics through said beam splitting means for acquiring a digital image of said reflected and fluorescent emission light and outputting said digital image; and computer means receiving said digital image of said reflected and fluorescent emission light for creating a virtual aperture and synthesizing a composite confocal image of said sample and displaying said confocal image.

2. The confocal imager as described in claim 1 wherein said light modulating means comprises a liquid crystal display.

3. The confocal imager as described in claim 1 wherein said light modulating means comprises a ferroelectric liquid crystal.

4. The confocal imager as described in claim 1 wherein said light modulating means comprises a micro-mirror device.

5. The confocal imager as described in claim 1 wherein said light modulating means comprises an acousto-optic beam steering device.

6. The confocal imager as described in claim 1 wherein said light modulating means comprises an electromechanical beam scanning system.

7. The confocal imager as described in claim 1 wherein said light modulating means comprises a microlens array translation system.

8. The confocal imager as described in claim 1 wherein said video capturing means comprises a charge coupled device.

9. The confocal imager as described in claim 1 wherein said video capturing means comprises a charge injection device.

10. The confocal imager as described in claim 1 wherein said video capturing means comprises a photodiode camera.

11. The confocal imager as described in claim 1 wherein said imaging optics comprise a microscope objective.

12. The confocal imager as described in claim 1 wherein said imaging optics comprise a photographic lens.

13. The confocal imager as described in claim 1 wherein said imaging optics comprise a videographic lens.

14. The confocal imager as described in claim 1 wherein said imaging optics comprise a gradient index lens.

15. A confocal image r comprising:

a light source emitting light;

light modulating means in optical communication with said light source for producing-a spatially and temporally varying pattern of illumination consisting of a plurality of discrete illumination sites;

first light focusing means receiving said spatially and temporally varying pattern of illumination for focusing said spatially and temporally varying pattern of illumination to scan across a sample;

second light focusing means for receiving light transmitted through said sample and focusing said transmitted light on video capturing means for receiving said transmitted light and outputting a digital image of said transmitted light;

computer means receiving said digital image of said transmitted light for creating a virtual aperture and synthesizing a confocal image of said sample and displaying said confocal image.

16. The confocal imager as described in claim 15 wherein said light modulating means comprises a liquid crystal display.

17. The confocal imager as described in claim 15 wherein said light modulating means comprises a ferroelectric liquid crystal.

18. The confocal imager as described in claim 15 wherein said light modulating means comprises a micro-mirror device.

19. The confocal imager as described in claim 15 wherein said light modulating means comprises a microlens array translation system.

20. The confocal imager as described in claim 15 wherein said light modulating means comprises an acousto-optic beam steering device.

21. The confocal imager as described in claim 15 wherein said light modulating means comprises an electromechanical beam scanning system.

22. The confocal imager as described in claim 15 wherein said video capturing means comprises a charge coupled device.

23. The confocal imager as described in claim 15 wherein said video capturing means comprises a photodiode array camera.

24. The confocal imager as described in claim 15 wherein said imaging optics comprise a microscope objective.

25. The confocal imager as described in claim 15 wherein said imaging optics comprise a photographic lens.

26. The confocal imager as described in claim 15 wherein said imaging optics comprise a videographic lens.

27. The confocal imager as described in claim 15 wherein said imaging optics comprise a gradient index lens.

28. The confocal imager as described in claim 1, applied as a microscope or endoscope operating in the reflected light or fluorescence light modes, said confocal imager further comprising:

spectrally dispersive means receiving said reflected and fluorescent emission light from said imaging optics for dispersing said reflected and fluorescent emission light from each of said plurality of discrete illumination sites into a linear spectrum to form a spectrally resolved image;

said video capturing means receiving said spectrally resolved image and creating a digital image of said spectrally resolved image and outputting said digital image;

said computer means receiving said digital image of said spectrally resolved image for creating a virtual aperture and synthesizing a composite confocal spectrally resolved image of said sample; and displaying said composite confocal spectrally resolved image.

29. The confocal imager as described in claim 15, applied as a microscope operating in the transmitted light mode, said confocal imager further comprising:

spectrally dispersive means receiving said transmitted light from said light modulating means for dispersing said transmitted light from each of said discrete illumination sites into a linear spectrum to form a spectrally resolved image;

said video capturing means receiving said spectrally resolved image and creating a digital image of said spectrally resolved image and outputting said digital image; and said computer means receiving said digital image of said spectrally resolved image for creating a virtual aperture and synthesizing a composite confocal spectrally resolved image of said sample; and displaying said composite confocal spectrally resolved image.

* * * * *